Sept. 19, 1967     D. R. PADOVANI     3,342,491
PROJECTING AND CATCHING DEVICE WITH RESILIENT NET
Original Filed Jan. 29, 1963     2 Sheets-Sheet 1
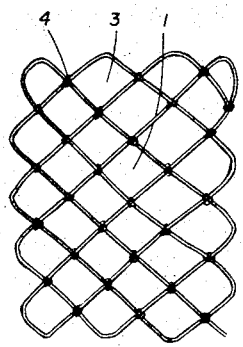
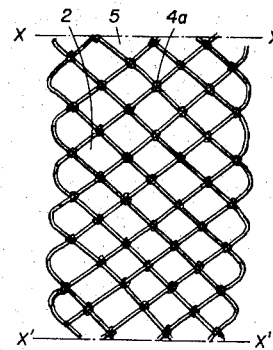
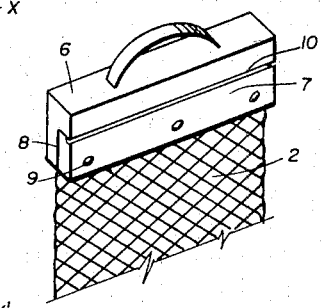
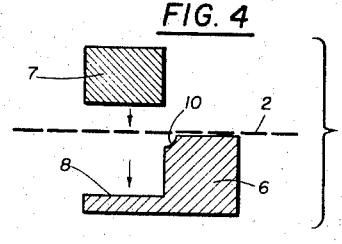
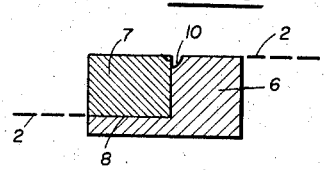
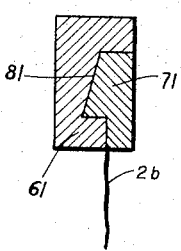
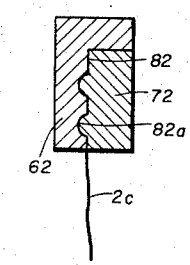
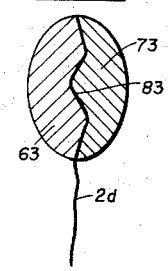
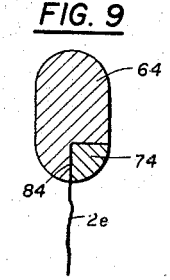
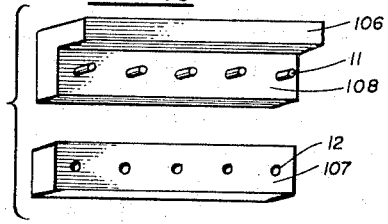
DOMINIQUE R. PADOVANI
INVENTOR.
BY
*Morron S. Blodget*

Sept. 19, 1967      D. R. PADOVANI      3,342,491
PROJECTING AND CATCHING DEVICE WITH RESILIENT NET
Original Filed Jan. 29, 1963                2 Sheets-Sheet 2

DOMINIQUE R. PADOVANI
INVENTOR.

United States Patent Office 3,342,491
Patented Sept. 19, 1967

3,342,491
PROJECTING AND CATCHING DEVICE WITH
RESILIENT NET
Dominique Rene Padovani, 36 Rue de la Coste,
Aurillac, France
Original application Jan. 29, 1963, Ser. No. 254,654, now
Patent No. 3,209,443, dated Oct. 5, 1965. Divided and
this application Aug. 2, 1965, Ser. No. 476,232
1 Claim. (Cl. 273—96)

This application is a divisional application of my application Serial Number 254,654, filed January 29, 1963, now Patent No. 3,209,443.

This invention relates to a game device and, more particularly, to a net device for use with a ball.

The securing of a meshed net to a handle or stick has been accomplished hitherto by inserting the handle through the meshes. The threads forming the meshes surround the handle; this arrangement is found in hammocks, butterfly nets, nets for various games, etc. In order that the meshes of a net may thus surround the handle, they must be suitably finished, which implies the use of nets manufactured by hand, usually of the so-called "fishing net" type. It is essential, in fact, that the ends of the net terminate in closed loops in order that they may engage the handle. Said conventional fitting cannot be used with more economical nets, manufactured mechanically, and cut to the desired lengths, since their cut ends necessarily include open meshes, by reason of the cut end terminating across the knots tying the meshes together instead of along the actual meshes.

The old method of securing a net over a handle leads to a device of doubtful strength because of the wear of the net as it rubs against the handle. There is also the drawback that the breadth of the handle is limited to the size of the meshes. On the other and, for the reasons stated, articles made up of nets secured to sticks or handles in accordance with the prior practice are expensive, since it is necessary to use hand-made nets and to secure them by hand; in fact, the introduction of the handle through the meshes cannot be executed by production methods. These and other difficulties experienced in the prior art have been obviated in a novel manner by the present invention.

Another object of this invention has for its object a novel apparatus for securing nets, whatever may be the size of their meshes, to a solid support such as a handle; furthermore, the invention also covers apparatus for producing articles of manufacture obtained in accordance with a novel method, chiefly fishing nets, hammocks, nets for games, net bags and the like, of which at least one end is secured to a handle, stick or the like resistant support.

With these and other objects in view, as will be apparent to those skilled in the art, the invention resides in the combination of parts set forth in the specification and covered by the claim appended hereto.

The character of the invention, however, may be best understood by reference to one of its structural forms, as illustrated by the accompanying drawings in which:

FIG. 1 is a plan view of a so-called "fisher's net,"

FIG. 2 illustrates a mechanically manufactured net,

Figure 12:
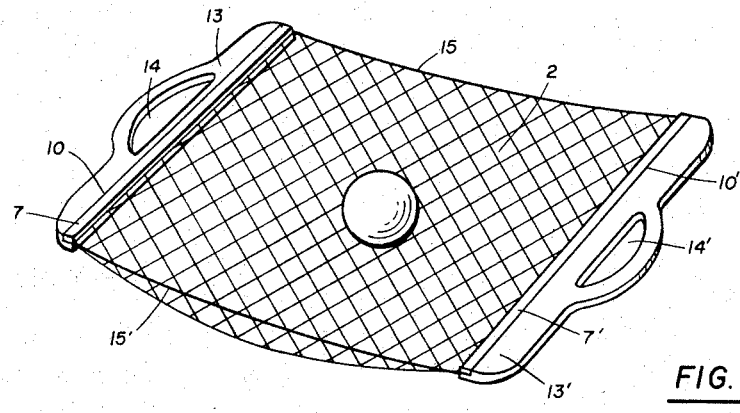
Figure 11:
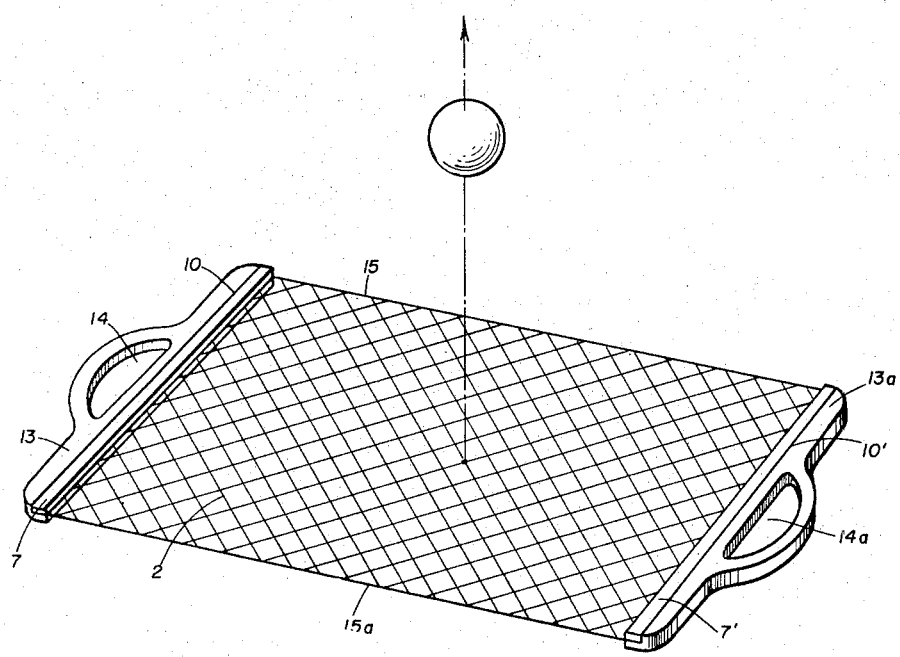

FIG. 3 is a perspective view of a portion of an article formed by a section of a net secured to a support in accordance with the principles of the present invention, FIG. 4 is a cross-sectional view of the support illustrated in FIG. 3, before it is secured to the net, FIG. 5 is a cross-sectional view of the support illustrated in FIG. 3 after the net has been secured to it, FIGS. 6 to 9 are cross-sectional views through four modifications of the invention, FIG. 10 is a perspective view of another modification of the support, and FIGS. 11 and 12 are views of a toy constructed in accordance with the invention and adapted to give an impetus to a ball in a game.

In a general way, the present invention consists in spreading a meshed net over a surface on which is laid a handle element so as to cover the element with the portion of the net to be secured to it, after which there is laid over said net portion, a part, cooperating with the element, which accurately matches the shape of the handle. The said cooperating part is then clamped over the element and secured to the latter. An outstanding feature of the invention is the arrangement in parallelism on a carrier surface of a series of elements provided for the manufacture of a plurality of the articles; the series is covered by means of a single common length of a mechanical net; a cooperating part is then laid, clamped and secured on each element, after which the net is cut along suitable lines so as to separate the articles obtained from each other. The securing of the cooperating part to the corresponding stick may be brought about by screwing, riveting, gluing or any other known means, and possibly by several of such means.

In a highly practical embodiment of the invention, the securing of the cooperating parts over the corresponding elements is brought about mechanically (instead of being performed manually) by means of a machine acting simultaneously on one or more handles and cooperating net-clamping parts. For instance, it is possible simultaneously to rivet a cooperating part on each of the two elements secured to the two opposite ends of a net. The apparatus for the execution of the securing method according to the invention, includes an assembling table, the length of which is proportional to the number of net-including articles to be produced simultaneously. The assembling table is provided with means for positioning the handle elements and retaining them. This means consists of recesses formed in the table, the shape and size of which recesses being such that the supports may be housed in the recesses while the parts of the supports on which the cooperating parts are to be applied, remain flush with the table. Means is provided for a suitable spreading, as a uniform sheet, of the desired length of net over the surface of the table; this means may be advantageously made up of a series of small bosses, cones or studs, distributed longitudinally and/or transversely on the table, and adapted to engage the meshes of the net.

According to my invention, it is possible to produce speedily, under good economical conditions, articles such as fishing nets, hammocks, game nets and various other similar articles. In such articles, the meshed net may be made of any desired material, such as textile, plastic, elastic, or metallic. The elements and the cooperating parts may be made of metal, wood, plastic material, or artificial board.

The supports and the parts cooperating therewith which orm the essential components of the articles according to the invention, are not necessarily made of the same material; for reasons of thickness and mechanical resistance, and also for aesthetic reasons, it may be of interest to resort to a cooperating part made of a material different from that of the element; for instance, metal and wood or plastic and metal may be used. The element and its cooperating part may be given various shapes, such as a triangular shape, a trapezium, the arc of a circle or any other flat geometrical figure. However, the simplest shape, which is at the same time of practical interest, is that where the surface of the stick or handle to which the net is to be secured, is rectilinear and is flattened. The contacting surfaces between the stick and the cooperating part may be flat, but it is advantageous, however, to give these surfaces a curvilinear, sinuous or toothed shape, with a view to more securely anchoring the net. In one embodiment of my invention, the cooperating part is provided with recesses and/or projections engaging corresponding projections and/or recesses of the stick. Thus, for instance, the element may be provided with projections such as bosses, fingers or studs, whereas openings are provided in the cooperating part for engagement by said projections; in such a case a high-strength engagement of the net may be obtained through the agency of glue, spread over the surfaces to be connected before the fitting of the cooperating net-securing part over the element.

Referring now to the figures, FIG. 1 shows a section 1 of a net of the so-called "fisher's net" type; the end meshes of said section, such as 3, are all finished and closed; in other words, none of the sides of the net section terminates at knots 4 but only along complete meshes 3 inside of which the support is caused to pass in accordance with the known procedure, so as to secure the net to said support. Such nets must be manufactured by hand.

FIG. 2 shows a section of a net 2 of the machine-made type, i.e., a net produced mechanically in pieces of a considerable length. The section 2 has been obtained by cutting from a long piece, the cuts being executed along lines XX and X'X''. Consequently, it is obvious that the cut ends of the net pass through or close to the knots 4a and the open meshes 5. It is, therefore, impossible to introduce a stick or the like support through the end meshes 5. In the production of articles in accordance with the invention, the net 2 is perfectly suitable and it is not necessary to use more expensive nets of the fisher type.

FIG. 3 shows the net 2 as secured to a handle or support element 6 by the clamping of the end of the net between a bearing surface 8 of the element and a cooperating part 7. In the perspective illustration, only the extreme left-hand edge of the bearing surface 8, forming part of the surface of the support element 6 covered by the cooperating part 7, can be seen. The cooperating part is secured to the element 6 and clamped over it by rivets 9 or the like.

The end edge of the net, provided with open meshes 5 and cut along line XX (FIG. 2), is held between the bearing surface 8 of the support and the cooperating part 7. If required, the line XX along which the section is cut, may extend up to a groove 10 provided along the upper interengaging edges of the elements 6 and the part 7. The construction of the article illustrated in FIG. 3 may be carried out by starting from a section cut beforehand as illustrated in FIG. 2. However, a more practical method consists in inserting such a machine-made net over the support element 6, as illustrated in FIG. 4 and then positioning the cooperating net-clamping part 7 (FIG. 5). This being done, a cutter blade is caused to pass through the groove 10 to cut the clamped section from the remainder of the net. It will be readily understood that this manner of operating permits the construction of a series of articles simultaneously, provided the desired number of support elements 6 are available, said supports being positioned at suitable intervals and being all covered by the same continuous net. A special arrangement for such an operation will be described hereinafter.

In FIGS. 6 to 10, I have illustrated a number of possible constructions of the support elements and the cooperating parts. FIG. 6 shows the cross-section of a support element 61 of which the bearing surface 81 is not flat but is serrated; furthermore, the cooperating part 71 is cut to show a cooperating serration which fits exactly in the recesses of the serration of the bearing surface 81. The net 2b is thus very tightly anchored between the element 61 and the part 71. FIG. 7 shows a further embodiment containing a support element 62 and a cooperating part 72 engaging each other along a bearing surface 82 provided with longitudinal grooves 82a and clamping a net 2c. The support element 63 illustrated in FIG. 8 is in the shape of a half oval with a serrated bearing surface 83, while the cooperating part 73 which has a similar and symmetrical shape which matches exactly the shape of the serrated bearing surface 83 and serves to clamp the net 2d. In the modification illustrated in FIG. 9, the support element 64 is formed as a stick having a generally oval cross-section and provided with a longitudinal groove 84 inside which is fitted a cooperating part such as a rod 74 forming the cooperating part which clamps a net 2e.

FIG. 10 is a perspective view of a support element 106 of the same type as that illustrated in FIGS. 3 to 5, but provided with a series of pegs 11; said FIG. 10 shows, furthermore, a cooperating part 107 provided with a series of bores 12 adapted to receive the pegs 11 exactly. The edge of the net is placed on the bearing surface 108 of the support element, so that the meshes may extend round the bosses 11. The cooperating part 107 is then fitted over the support 106 through engagement of the pegs 11 inside the bores 12. The parts are then clamped together and secured by means of rivets or the like, not illustrated. Consequently, the net is held not only through clamping but also through engagement of the meshes round the corresponding pegs 11. It may be preferable in some cases to secure the different parts together by means of glue spread over the bearing surface 108 and preferably also over the edges of the bosses. An article of a remarkable resistance is thus obtained.

FIGS. 11 and 12 illustrate a novel game constituted by a section of the meshed net 2 secured at both ends to support elements 13 and 13a provided with handles 14 and 14a. The net 2 is provided with two elastic threads 15 and 15a which urge the elements 13 and 13a toward each other. In FIG. 11, the elastic strings 15 and 15a are stretched horizontally, whereas in the case of FIG. 12, they are released. When the handles are drawn outwardly so as to make the net pass from the condition illustrated in FIG. 11 to that illustrated in FIG. 12, a ball or a shuttle-cock carried on the net is projected upwardly. Such an arrangement is already known, but the game has never been constructed hitherto on a commercial scale by reason of the above-mentioned drawback, caused by the conventional manner of securing the net to its support elements. The present improved method permits the net to be easily constructed for this game in large amounts, while its strength allows it to serve well for sporting purposes. In the special form of the game illustrated in FIGS. 11 and 12, the net 2 is made of elastic threads; in contrast, the strings 15 and 15a are made of only slightly elastic material.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

A game implement, comprising (a) a net comprising a plurality of strands having a given thickness and a given elasticity, said net having two opposed sides and two edges;
(b) two strings having a thickness greater than said given thickness, and an elasticity less than said given elasticity and ends, said strings extending along said edges;
(c) two flat elongated handle support elements provided with first uneven surfaces, said surfaces carrying said opposed sides of said net and said ends of said strings;
(d) net clamping parts provided with second uneven surfaces interlockable with said first uneven surfaces; and
(e) means rigidly securing said net clamping parts to said support elements through said uneven surfaces and over said opposed sides and said ends.

References Cited

UNITED STATES PATENTS

| | | | |
|---|---|---|---|
| 898,350 | 9/1908 | Foster | 273—96 |
| 1,488,672 | 4/1924 | Harrison | 273—96 |
| 1,808,035 | 6/1931 | Guenard | 273—73 |
| 2,201,802 | 5/1940 | Steiner | 273—96 |
| 2,465,808 | 3/1949 | Killam | 273—96 |

FOREIGN PATENTS

| | | |
|---|---|---|
| 547,719 | 5/1956 | Belgium. |
| 23,690 | 1907 | Great Britain. |
| 27,679 | 1908 | Great Britain. |

ANTON O. OECHSLE, *Primary Examiner.*

DELBERT B. LOWE, F. BARRY SHAY, *Examiners.*

M. R. PAGE, *Assistant Examiner.*